May 6, 1952  C. S. BORUFF ET AL  2,595,827
RECOVERY OF FEED PRODUCTS FROM
STILLAGE BY REFERMENTATION
Original Filed March 30, 1945
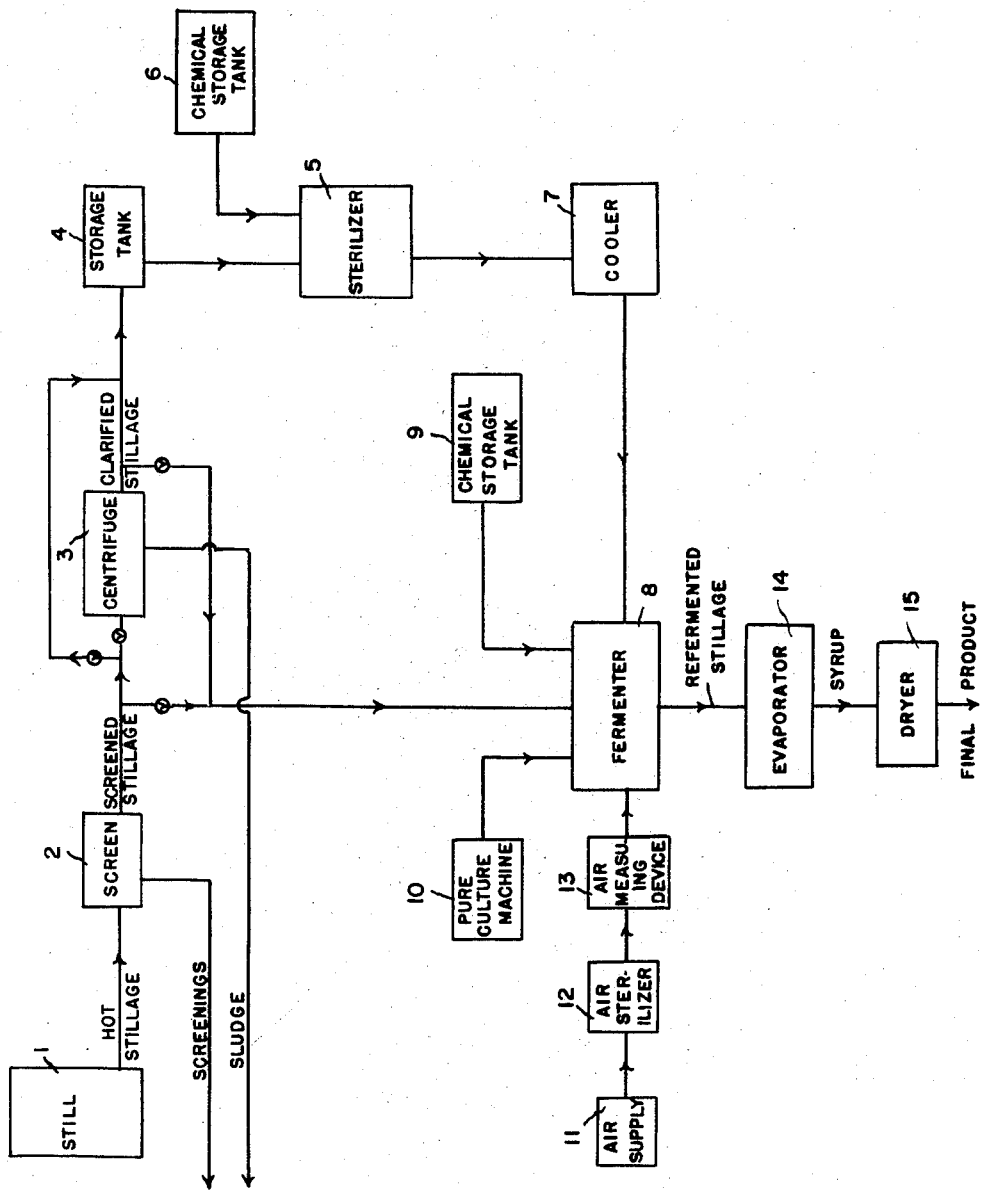
INVENTORS
CLAIR S. BORUFF
LEONARD STONE
JACOB C. BAUERNFEIND
JOHN C. GAREY
BY Arthur H. Stuart
ATTORNEY Patented May 6, 1952

2,595,827

UNITED STATES PATENT OFFICE 2,595,827

RECOVERY OF FEED PRODUCTS FROM STILLAGE BY REFERMENTATION

Clair S. Boruff and Leonard Stone, Peoria, Ill., and Jacob C. Bauernfeind, Nutley, N. J., and John C. Garey, State College, Pa., assignors to Hiram Walker & Sons Inc., Peoria, Ill.

Original application March 30, 1945, Serial No. 585,698. Divided and this application October 3, 1947, Serial No. 777,708

8 Claims. (Cl. 195—37)

This invention relates to the recovery of feed by-products from stillage from a primary alcohol fermentation, as for example grain fermentation stillage or slop, and more particularly to a new process of treatment of such stillage to increase the vitamin content thereof, thereby increasing the nutritive value of of the recoverable feed. The present application is a division of our co-pending application U. S. Serial No. 585,698, filed March 30, 1945, now abandoned.

Recovery of feed by-products from distillers' residues is commonly practiced at the present time. In many instances only the screenable solid portion of the residue is recovered, the liquid portion being run off into streams as waste. In other instances both the insoluble and soluble solids are recovered together, while in still other instances various fractions may be recovered separately, yielding distillers' dried grains, distillers' dried grains with solubles, and distillers' dried solubles. These materials are high quality, high protein feeds, and, in the case of solubles, are also rich in water-soluble B-complex vitamins.

We have found that the stillage from a primary alcohol fermentation can, under suitable conditions, be refermented with the yeast or yeast-like organism Ashbya gossypii to produce desired vitamins from the residual carbohydrates and other constituents left in the stillage. Concentration and drying of the refermented vitamin-enriched stillage by customary methods gives a final product of high vitamin content which can be advantageously used as an ingredient of mixed feeds for livestock and poultry or as a vitamin carrying material for preparing human foods. We have further found that if a source of nitrogen is added to the stillage the micro-organism will also synthesize protein and thus increase this valuable constituent in the final product. Likewise our work has shown that the synthesis of desirable vitamins can be increased by adding a small quantity of easily fermentable carbohydrate to the stillage.

Briefly, the process as developed by us consists in adjusting the pH and temperature of the previously sterilized stillage to values favorable to microbial fermentation, inoculation of the medium with the prepared micro-organism, fermentation with controlled aeration, and then concentrating first to a thick syrup, and then to a free-flowing solid material by evaporating and drying procedures customarily used for recovering distillers' by-products.

From the following description of the invention it will be noted that, in the main, the novel features reside in control of the flora through sterile handling of the sterile stillage, sterilization at an acid pH which accomplishes considerable hydrolysis, careful acidity and nutrilite control at the beginning and during refermentation, regulating the length of time allowed for refermentation to give the maximum vitamin yield, and selection of Ashbya gossypii as the micro-organism capable of refermentating the stillage in a relatively short period of time to increase the vitamin content and yield a nutritionally more balanced feed.

The carbohydrate that is left in the stillage from a primary alcohol fermentation, as, for example, grain alcohol fermentation, is non-fermentable by ordinary distillers' yeast to alcohol. However, our experimentations have shown that Ashbya gossypii will ferment the carbohydrate and other compounds remaining in such stillage to very materially increase the B-complex vitamin content, including not only the commonly known but also the less well known members of that group, as well as other vitamin-like complexes and accessory materials of known physiological importance but unknown chemical structure.

The preferred process will be described with reference from time to time to the accompanying flow sheet. Hot stillage from the still 1, after passing through the screen 2 is pumped to a centrifuge 3 where more suspended solids not removed by the screen are taken out. The clarified stillage passes from the centrifuge 3 to a storage tank 4. If preferred, the centrifuge may be by-passed, the screened stillage being taken directly to storage tank 4. From the latter the stillage is pumped to a sterilizer 5. Complete sterilization can be effected by introducing steam at ten pounds pressure for about one hour, or by pumping the stillage through a heated conduit. It would also be possible to sterilize the stillage by use of infra-red rays, or by chemical treatment.

Sterilization by heating at this stage, when the stillage is acid, having a pH of around 4, results in acid hydrolysis which makes available additional nutrients, mainly carbohydrates, for the refermentation.

Following sterilization, the pH of the stillage is adjusted to a value favorable to microbial growth. When Ashbya gossypii is used in the refermentation process a pH value of from about 6.0 to 7.5 is satisfactory. The acid present in the stillage may be neutralized with an hydroxide of an alkali or alkaline earth metal, as for example sodium hydroxide, potassium hydroxide, calcium hydroxide and the like. Likewise alkaline salts such as sodium carbonate, potassium carbonate and calcium carbonate may be used as neutralizing agents. Certain ammonium compounds will also serve as neutralizing agents in this connection as for example ammonium hydroxide and ammonium carbonate. The stillage is neutralized in the sterilizer 5, the alkalizing agent being supplied from a chemical storage tank 6, and is then pumped to a cooler 7 where it is cooled to a temperature optimum for refermentation. A temperature of between approximately 70 and 90 degrees Fahrenheit is preferred, this being the temperature at which the stillage should be maintained at the time of inoculum addition and during refermentation. From the cooler 7 the stillage is pumped to the fermenter 8.

If preferred, sterilization and initial pH adjustment may be performed in the fermenter 8 in which case the stillage would be pumped directly from the screen 2, or from the centrifuge 3 if that is used, to the fermenter 8 which will have been previously sterilized by steam treatment. We might also explain that if desired the pH may be adjusted before sterilization. However we prefer to sterilize at the lower pH and then adjust the pH to the higher value because additional nutrients are released by sterilization at the lower pH.

It might be appropriately mentioned at this point that if, during the course of refermentation, excess alkalinity or acidity develops after the initial pH adjustment it is necessary to add an acidifying or alkalizing agent, as the case may be, to bring the pH back into the favorable range for vitamin synthesis. The alkalizing agent may be any one of the aforementioned compounds described as suitable for initially neutralizing the acid present in the stillage. As an acidifying agent acids such as hydrochloric, phosphoric and acetic, or acid salts such as acid phosphates and acid sulphates may be used. Such agents may be supplied to the stillage in the fermenter from a chemical storage tank 9.

The sterilized stillage, appropriately adjusted as to pH and temperature, having reached the fermenter 8, a suitable amount of a culture of the micro-organism *Ashbya gossypii* is then introduced from a pure culture machine 10, and aeration is started by introducing air which has previously been sterilized, as for example by passage through tubes of sterile cotton, over white hot iron, treatment with ultraviolet light, or the like. In the flow sheet the source of air supply is shown at 11, the air sterilizer at 12 and the air measuring device at 13. The volume of air should be the optimum for the micro-organism.

The volume of inoculum and the age of the inoculum depend on the micro-organism used. In the case of *Ashbya gossypii*, a 48 hour culture and one percent by volume of inoculum have been found satisfactory. The pure cultures used are grown on standard laboratory media, and aeration may be supplied by introducing a stream of sterile air through a tube, or by mechanical shaking.

The time required for completion of the refermentation may vary considerably. It may run as high as 60 hours, or more, or as low as 10 to 12 hours. When refermentation is completed the stillage is evaporated by standard methods to a thick syrup and then dried to a solid. For example it may be pumped from the fermenter 8 to an evaporator 14 where it is evaporated under a vacuum of about 20 millimeters of mercury to a thick syrup. It is then passed to a drum dryer 15 where it is dried to a free flowing solid.

Although it can be evaporated at the pH of refermentation, we find that we get better results if we acidify the refermented stillage to a pH of approximately 5.0 before evaporating. By so doing we find that we get less foam and a lighter colored final product. A mineral acid such as hydrochloric or phosphoric may be used for this acidification and may be supplied from a suitable compartment in the chemical storage tank 9.

Because of the manner in which the vitamins are synthesized right in the stillage prior to evaporation and drying, the final dried product possesses characteristics which render it most useful as a feed ingredient. Because the vitamins are evenly dispersed in the concentration process the final dried product is free from any tendency of settling out or separation of the vitamins such as occurs when crystalline vitamins are mixed with a flaky or ground material i. e. simply suspended between particles. In the case of riboflavin this dispersion within the particles protects the riboflavin from light, thus greatly decreasing the destructive effect of light. This internal dispersion of the vitamins also decreases oxidative deterioration due to contact with air. For these reasons the product is very stable and can be stored for long periods with but small loss of vitamin potency. The product is also superior to one obtained by simply mixing with known crystalline vitamins because the micro-organism used greatly increases the content, not only of the known but also of the less well-known, vitamins and vitamin-like complexes of recognized physiological importance but whose chemical structure, being unknown, are not yet capable of being synthesized in the laboratory, and hence are not available for fortification by mixing.

Reference has already been made to protein synthesis as a step in our novel process. We prefer to supplement the vitamin synthesis with protein synthesis and we have found that this may be accomplished in the same process of refermentation by adding to the stillage prior to inoculation and refermentation a small amount of a nitrogen-containing nutrient material such as an ammonium compound, for example ammonium hydroxide and ammonium carbonate, or an amino compound, such as glycine, or an imino compound, such as occurs in proline, or an amide such as acetamide and urea. Such compounds, we find, are synthesized to proteins, polypeptides or amino acids, by the same micro-organisms which synthesize components of the vitamin B complex, and thus increase the protein value of the final feed in proportion to the amount of nitrogen added. Where the nitrogen containing material is also an alkalizing agent, as for example ammonium hydroxide, it also serves as a neutralizing agent for the excess acid in the stillage, thus making unnecessary the addition of another alkalizing agent to control the pH. The nitrogen-containing material is preferably added to the stillage while it is in the sterilizer 5, and before sterilization. It may be supplied from a suitable compartment in the chemical storage tank 6, or from a compartment in the tank 9 if the stillage is run directly to the fermenter from the screen 2 or the centrifuge 3.

Also, as has already been mentioned, we prefer to increase the vitamin synthesis by the addition to the stillage of a small quantity of an easily fermentable carbohydrate, as for example addition of 2% or less by weight of cane molasses or sugar. Carbonhydrate addition is not necessary to effect vitamin improvement but such addition will increase the improvement. Such supplemental nutrients are preferably added before sterilization, and may be supplied from a suitable compartment in the chemical storage tank 6 or from a compartment in the tank 9 if the stillage is run directly to the fermenter from the screen 2 or the centrifuge 3.

If preferred, the whole stillage can be refermented before screening to yield a soluble fraction of greatly increased vitamin potency. In that case the refermented stillage would then be screened and also centrifuged, if desired, before being concentrated to a solid in the manner previously described.

The following example, illustrating a typical procedure we have carried out, and the resultant product obtained therefrom, will serve to give a clearer understanding of the invention:

Two hundred milliliters of centrifuged thin stillage (3.8% solids) obtained from a primary fermentation mash consisting of 79.20% corn, 11.00% rye and 9.80% barley malt, were placed in a 500 ml. Erlenmeyer flask and the pH adjusted to 7.2 with 10% sodium hydroxide using a Beckman pH meter. The flask and appropriate connections were sterilized in an autoclave at 15 pounds' pressure for 30 minutes. After cooling, the media was inoculated with 2 milliliters of a 48 hour broth culture of *Ashbya gossypii*. The contents of the flask were aerated by a stream of sterile air (one bubble per second through a 3 millimeter capillary tube). The refermentation was carried out for 84 hours at a temperature of 72 degrees F.

The material (3.7% solids) was condensed in vacuo and dried under and infra-red ray lamp. The comparison of the dried product with the original material when dry is as follows:

|  | Dry Original Material | Dry Refermentation Material |
| --- | --- | --- |
|  | Mcg./gram | Mcg./gram |
| Riboflavin | 15 | 75 |
| Pantothenic acid | 20 | 69 |
| Niacin | 195 | 234 |

We find that our refermentation process gives a stillage which can be evaporated to higher total solids content than stillage which has not been refermented. In practice this means a considerable saving in steam cost because more of the drying can be carried out in the evaporators thus leaving less drying to be accomplished on the final drum dryers. When drying with drum dryers about two to three pounds of steam are required per pound of water, whereas in the evaporators only about one-third pound of steam per pound of water is required. Thus more of the drying process can be carried out in the evaporators when drying our refermented stillage than is possible when concentrating primary stillage. This is no doubt due to additional protein denaturing in the refermentation process which makes the material less sticky, that is, less viscous than primary stillage.

It will be understood that the product resulting from our refermentation process is primarily intended for use as an accessory product in poultry and animal feeds as an auxiliary source of the B complex vitamins. Because of its vitamin potency it will be preferably used in relatively small percentages as a supplementary ingredient. While the additional protein which can be synthesized during the refermentation will also add valuable supplementary protein to the feed, such protein source is a secondary consideration in such feeds because only a relatively small percentage of the new product will be needed in a ration to give the desired additional vitamin concentration in the mixed feed. For example in a poultry ration the main constituents comprise ground corn, certain wheat by-products, soybean meal, a small quantity of some type of meat scrap, etc. Assaying of these constituents indicates a deficiency in the B complex vitamins as well as the fat soluble vitamins, namely A and D. The aforementioned constituents contain certain quantities of the nutritionally essential vitamins but not in sufficient quantities to give a nutritionally balanced ration. Therefore fish or other oils containing vitamins A and D are added; likewise supplemental sources of the B complex vitamins are added, and it is in this last connection that our new product is particularly useful. The addition of 2% to 5% of these vitamin carrying materials to the aforementioned cereals or cereal by-products gives a nutritionally balanced ration, that is a ration which is balanced as to protein, fat, etc., as well as its content of the various vitamins.

What we regard as new and desire to secure by Letters Patent is:

1. In the treatment of stillage from a primary alcohol fermentation to increase the content of water soluble vitamins of the B complex and other growth-stimulating substances, the step which comprises subjecting the stillage to the fermentative action of the ascomycete *Ashbya gossypii* under controlled aeration.

2. In the treatment of stillage from a primary alcohol fermentation to increase the content of water soluble vitamins of the B complex and other growth-stimulating substances, the steps of which comprise subjecting the stillage to the fermentative action of the ascomycete *Ashbya gossypii* under controlled aeration and while maintaining the pH and temperature of the fermentation mixture at values favourable to growth of said ascomycete.

3. In the treatment of stillage from a primary alcohol fermentation to increase the content of water soluble vitamins of the B complex and other growth-stimulating substances, the steps which comprise adjusting the pH of the stillage to between approximately 6.0 and 7.5 and the temperature to between approximately 70° and 90° Fahrenheit and then subjecting it to the fermentative action of the ascomycete *Ashbya gossypii* under controlled aeration and while maintaining the temperature within the aforesaid limits.

4. In the treatment of stillage from a primary alcohol fermentation to increase the content of water soluble vitamins of the B complex and other growth-stimulating substances, the steps which comprise adding an alkalizing agent selected from the group consisting of the hydroxides and alkaline salts of the alkali and alkaline earth metals to bring the pH to between approximately 6.0 and 7.5, adjusting the temperature to between approximately 70° and 90° Fahrenheit and then subjecting it to the fermentative action of the ascomycete *Ashbya gossypii* under controlled aeration and while maintaining the temperature within the aforesaid limits.

5. In the treatment of stillage from a primary alcohol fermentation to increase the content of water soluble vitamins of the B complex and other growth-stimulating substances, the steps of which comprise adding to the stillage a small amount of a nitrogen-containing material and then subjecting it to the fermentative action of the ascomycete *Ashbya gossypii* under controlled aeration.

6. In the treatment of stillage from a primary alcohol fermentation to increase the content of water soluble vitamins of the B complex and other growth-stimulating substances, the steps which comprise adding to the stillage a nitrogen-containing alkalizing agent to bring the pH to between approximately 6.0 and 7.5, adjusting the temperature to between approximately 70° and 90° Fahrenheit and then subjecting it to the fermentative action of the ascomycete *Ashbya gossypii* under controlled aeration and while maintaining the temperature within the aforesaid limits.

7. In the treatment of stillage from a primary alcohol fermentation to increase the content of water soluble vitamins of the B complex and other growth-stimulating substances, the steps which comprise adding to the stillage a small percentage of an easily fermentable carbohydrate, and then subjecting it to the fermentative action of the ascomycete *Ashbya gossypii* under controlled aeration.

8. The method of treating grain alcohol stillage to increase the content of B complex vitamins and other growth stimulating substances which comprises the steps of sterilizing the stillage, inoculating it with the yeast *Ashbya gossypii* and fermenting the inoculated stillage while supplying air to the fermenting medium.

CLAIR S. BORUFF.
LEONARD STONE.
JACOB C. BAUERNFEIND.
JOHN C. GAREY.

REFERENCES CITED

The following references are of record in the file of this patent:

UNITED STATES PATENTS

| Number | Name | Date |
|---|---|---|
| 1,532,858 | Bacon | Apr. 7, 1925 |
| 2,098,200 | Stiles | Nov. 2, 1937 |
| 2,202,161 | Miner | May 28, 1940 |
| 2,374,503 | Rudert | Apr. 24, 1945 |
| 2,400,710 | Piersma | May 21, 1946 |
| 2,445,128 | Tanner | July 13, 1948 |
| 2,447,814 | Novak | Aug. 24, 1948 |

OTHER REFERENCES

Raffy: Comptes Rendus, T126, December 4, 1937, pp. 875 to 877.

Schopfer: Helvetica Chemica, Acta V, XXVII, pp. 1017 to 1032; p. 1019 relied upon.

Guilliermond: Comptes Rendus, T200, May 6, 1935, pp. 1556 to 1558.

Wickerham: Arch. of Biochem., vol. 9, No. 1, January 1946, pp. 95 to 98.